US012746508B2

(12) United States Patent
Lackner et al.

(10) Patent No.: US 12,746,508 B2
(45) Date of Patent: Sep. 29, 2026

(54) DEVICE AND METHOD FOR PASSIVE COLLECTION OF ATMOSPHERIC CARBON DIOXIDE WITH A DOUBLE-WALLED HARVEST CHAMBER

(71) Applicant: ARIZONA BOARD OF REGENTS ON BEHALF OF ARIZONA STATE UNIVERSITY, Scottsdale, AZ (US)

(72) Inventors: Klaus Lackner, Longmont, CO (US); Shreyans Kedia, Tempe, AZ (US); Brinton Carlson, Turlock, CA (US); Venkatram Choodamani, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 344 days.

(21) Appl. No.: 18/700,628

(22) PCT Filed: Oct. 11, 2022

(86) PCT No.: PCT/US2022/046339
§ 371 (c)(1),
(2) Date: Apr. 11, 2024

(87) PCT Pub. No.: WO2023/064317
PCT Pub. Date: Apr. 20, 2023

(65) Prior Publication Data

US 2025/0229222 A1 Jul. 17, 2025

Related U.S. Application Data

(60) Provisional application No. 63/254,327, filed on Oct. 11, 2021.

(51) Int. Cl.
*B01D 53/62* (2006.01)
*B01D 53/34* (2006.01)
(Continued)

(52) U.S. Cl.
CPC ........... *B01D 53/62* (2013.01); *B01D 53/346* (2013.01); *B01D 53/82* (2013.01); *B01D 53/96* (2013.01);
(Continued)

(58) Field of Classification Search
CPC ...... B01D 53/62; B01D 53/346; B01D 53/82; B01D 53/96; B01J 49/07; B01J 49/40; B01J 41/14
See application file for complete search history.

(56) References Cited

U.S. PATENT DOCUMENTS

| | | | |
|---|---|---|---|
| 8,133,305 | B2 | 3/2012 | Lackner |
| 8,715,394 | B2 | 5/2014 | Caram |

(Continued)

FOREIGN PATENT DOCUMENTS

| | | |
|---|---|---|
| WO | 2020092272 | 5/2020 |

OTHER PUBLICATIONS

Wang, T., Lackner, K. S., & Wright, A. (2011). "Moisture swing sorbent for carbon dioxide capture from ambient air." Environmental science & technology, 45(15), 6670-6675.

(Continued)

*Primary Examiner* — Sean E Conley
(74) *Attorney, Agent, or Firm* — FULLER IP LAW LLC; Rodney J. Fuller

(57) ABSTRACT

A device and method for passive collection of atmospheric CO2 is disclosed. The device includes a chamber having an inner wall, an outer wall, an annular void between the inner and outer walls, and a sump connecting the annular void and an inner cylinder. The device also includes a capture structure having a sorbent material and movable between open and closed configurations. The device includes a water delivery device with a pump and a water applicator positioned within the annular void to dispense water onto the
(Continued)

outer wall. The pump transfers water from the sump to the applicator. The open configuration includes the sorbent exposed and allowed to capture CO2. The closed configuration includes the capture structure being enclosed inside the chamber such that a heated water vapor releases captured CO2. The vapor is created by the solar heating of the outer wall and the water dispensed within.

20 Claims, 7 Drawing Sheets

(51) Int. Cl.

| | |
|---|---|
| ***B01D 53/82*** | (2006.01) |
| ***B01D 53/96*** | (2006.01) |
| ***B01J 41/14*** | (2006.01) |
| ***B01J 49/07*** | (2017.01) |
| ***B01J 49/40*** | (2017.01) |

(52) U.S. Cl.

CPC ............... *B01J 41/14* (2013.01); *B01J 49/07* (2017.01); *B01J 49/40* (2017.01); *B01D 2253/202* (2013.01); *B01D 2253/206* (2013.01); *B01D 2257/504* (2013.01); *B01D 2258/06* (2013.01); *B01D 2259/4009* (2013.01); *B01D 2259/802* (2013.01)

(56) References Cited

U.S. PATENT DOCUMENTS

| | | | |
|---|---|---|---|
| 9,283,510 | B2 | 3/2016 | Lackner |
| 10,279,306 | B2 | 5/2019 | Gebald |
| 2009/0294366 | A1 | 12/2009 | Wright |
| 2013/0298769 | A1 | 11/2013 | Petruska |
| 2015/0004084 | A1 | 1/2015 | Goldberg |
| 2020/0398214 | A1 | 12/2020 | Lackner |

OTHER PUBLICATIONS

Wang, T., Lackner, K. S., & Wright, A. B. (2013). "Moisture-swing sorption for carbon dioxide capture from ambient air: a thermodynamic analysis." Physical Chemistry Chemical Physics, 15(2), 504-514.

DEVICE AND METHOD FOR PASSIVE COLLECTION OF ATMOSPHERIC CARBON DIOXIDE WITH A DOUBLE-WALLED HARVEST CHAMBER

RELATED APPLICATIONS

This application is a national stage of International Application No. PCT/US2022/046339, filed on Oct. 11, 2022, titled "Device and Method for Passive Collection of Atmospheric Carbon Dioxide with a Double-Walled Harvest Chamber," which claims the benefit of U.S. provisional patent application 63/254,327, filed Oct. 11, 2021 titled "Device and Method for Passive Collection of Atmospheric Carbon Dioxide with a Double-Walled Harvest Chamber," the entirety of the disclosures of which are hereby incorporated by this reference.

TECHNICAL FIELD

Aspects of this document relate generally to collection of atmospheric carbon dioxide.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis.

Capture of carbon dioxide from ambient air at an affordable price could become a critical tool in managing the anthropogenic carbon cycle. Air capture technology would greatly enhance the options for developing the world's energy infrastructure and would be a major asset in the fight against climate change. Combined with carbon dioxide storage technologies, air capture of $CO_2$ could compensate for $CO_2$ emissions from any source, without requiring changes to the existing infrastructure and without requiring proximity to the point of emission. Air capture technology would make it possible for existing infrastructures to live out their natural life spans, and would permit the continued use of carbon-based fuels in distributed and mobile applications, for example in the transportation sector.

Nevertheless, these technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk. In particular, actively heating or cooling the air, drying the air, or significantly changing the air pressure using conventional methods would exceed any reasonable energy budget. Additionally, conventional carbon dioxide collection systems often exhibit the unfortunate combination of being costly and fragile. Conventional capture devices also often have a large initial capital cost along with a high operating cost.

A promising technology that is well adapted for capturing dilute atmospheric carbon dioxide in an energy efficient manner is passive direct air capture, or passive DAC, which is distinguished from other DAC technologies which require additional energy for the forced convection of air. Air contactor surfaces that comprise sorbent materials are exposed to passive atmospheric air flows, capturing carbon dioxide with the sorbent material to be released within an appropriate context for further processing, use, and/or storage.

Although drastically reduced compared to conventional systems, direct air capture still must operate on a tight energy budget. For many sorbent materials, the use of hot water vapor can lead to better performance. However, providing that heat with conventional methods can quickly exceed the energy budget.

SUMMARY

According to one aspect, a device for passive collection of atmospheric carbon dioxide includes a harvest chamber having an inner wall forming an inner cylinder with an opening, an outer wall, an annular void between the inner wall and outer wall, and a water-filled sump at the bottom of the harvest chamber connecting the annular void and the inner cylinder. The device also includes a capture structure coupled to the harvest chamber and having a sorbent material. The capture structure is movable between an open configuration and a closed configuration. The device also includes an upper lid positioned above the capture structure. The upper lid is coupled to the capture structure. The device further includes a water delivery device having at least one water applicator and a water pump. The at least one water applicator is positioned within the annular void proximate the top of the annular void and configured to dispense liquid water onto a surface of at least one of the inner wall and outer wall within the annular void. The water pump is in fluid communication with the water-filled sump and configured to transfer liquid water from the water-filled sump to the at least one water applicator. The open configuration includes the capture structure extending upward from the harvest chamber to expose at least a portion of the capture structure to an airflow and allow the sorbent material to capture atmospheric carbon dioxide, with the capture structure expanded to occupy a collection volume. The closed configuration includes the capture structure collapsed to occupy a regeneration volume that is smaller than the collection volume, with the upper lid covering the opening of the inner cylinder. The capture structure is sufficiently enclosed inside the inner cylinder that a heated water vapor operates on the sorbent material of the capture structure to release captured carbon dioxide from the sorbent material to form an enriched gas within the harvest chamber. The heated water vapor is created by the solar heating of the outer wall and the liquid water dispensed by the water delivery device within the annular void. The enriched gas is provided as a product stream through a product outlet in fluid communication with the inside of the harvest chamber.

Particular embodiments may comprise one or more of the following features. The capture structure may include a plurality of collapsible supports and a plurality of disks coupled to and spaced along the plurality of collapsible supports. Each disk may have the sorbent material. The closed configuration may include the plurality of collapsible supports of the capture structure being collapsed inside the harvest chamber. The device may further include a plurality of shades positioned outside the harvest chamber and coupled to the upper lid. Moving from the closed configuration to the open configuration may include the plurality of shades being elevated with the capture structure. The open configuration may further include the plurality of shades being positioned to shield the sorbent material of the capture structure from direct exposure to sunlight while allowing the outer wall of the harvest chamber to be exposed to sunlight.

The closed configuration may further include the plurality of shades being lowered and collapsed such that the outer wall of the harvest chamber remains exposed to sunlight. The inner wall may include a plurality of return vents proximate the top of the annular void. The annular void may be in fluid communication with the inner cylinder through the plurality of return vents. The device may further include a lower lid coupled to the capture structure and positioned below the capture structure such that the capture structure may be between the lower lid and the upper lid. Moving from the closed configuration to the open configuration may include the lower lid rising up the inner cylinder. The open configuration may further include the lower lid blocking the opening of the inner cylinder while the capture structure is in the open configuration such that the loss of heated water vapor from the inner cylinder is reduced. The harvest chamber may further include an upper flange around the perimeter of the opening. The closed configuration may further include the lower lid pressed against an interior surface of the upper flange the interior surface may face toward the inner cylinder. The lower lid may further include an aperture and a cover that may be wider than the aperture and/or on top of the lower lid. The open configuration may further include the cover resting on top of the aperture such that the flow of heated water vapor through the aperture from beneath the lower lid is prevented such that the loss of heated water vapor from the inner cylinder is reduced. Moving from the open configuration to the closed configuration may include the lower lid being lowered onto a protrusion inside the inner cylinder. The protrusion may pass through the aperture and may lift the cover off of the lower lid. The closed configuration may further include the cover being raised off of the aperture by the protrusion such that heated water vapor can flow through the aperture from beneath the lower lid. The harvest chamber may include a solar coating on an exterior surface. The solar coating may be configured to increase the absorption of sunlight to heat the outer wall of the harvest chamber. The device may further include a fan inside the inner cylinder, positioned above the water filled sump and below the capture structure. The fan may be configured to increase movement of the heated water vapor within the harvest chamber. The at least one water applicator may be a spray nozzle. The water delivery device may include a plurality of water applicators. Each water applicator of the plurality of water applicators may be located within a different segment of the annular void and may be configured to dispense liquid water onto the surface of at least one of the inner wall and outer wall within that segment of the annular void. The device may further include at least one sensor communicatively coupled to the water delivery device. The water delivery device may be configured to dispense liquid water to a segment of the annular void through a water applicator within said segment in response to a condition detected on the outer wall of said segment by the at least one sensor. The condition is at least one of a temperature and a sunlight exposure. The water delivery device may be configured to dispense liquid water to a segment of the annular void through a water applicator within said segment in response to a timer.

According to another aspect of the disclosure, a device for passive collection of atmospheric carbon dioxide includes a harvest chamber having an inner wall forming an inner cylinder with an opening, an outer wall, an annular void between the inner wall and outer wall, and a water-filled sump at the bottom of the harvest chamber connecting the annular void and the inner cylinder. The device also includes a capture structure coupled to the harvest chamber and having a sorbent material. The capture structure is movable between an open configuration and a closed configuration. The device includes an upper lid positioned above the capture structure, with the upper lid coupled to the capture structure. The device further includes a water delivery device having at least one water applicator and a water pump, the at least one water applicator positioned within the annular void proximate the top of the annular void and configured to dispense liquid water onto a surface of at least one of the inner wall and outer wall within the annular void. The water pump is in fluid communication with the water-filled sump and configured to transfer liquid water from the water-filled sump to the at least one water applicator. The device includes a lower lid coupled to the capture structure and positioned below the capture structure such that the capture structure is between the lower lid and the upper lid. The open configuration includes the capture structure extending upward from the harvest chamber to expose at least a portion of the capture structure to an airflow and allow the sorbent material to capture atmospheric carbon dioxide, with the capture structure expanded to occupy a collection volume. The closed configuration includes the capture structure collapsed to occupy a regeneration volume that is smaller than the collection volume, with the upper lid covering the opening of the inner cylinder. The capture structure is sufficiently enclosed inside the inner cylinder that a heated water vapor operates on the sorbent material of the capture structure to release captured carbon dioxide from the sorbent material to form an enriched gas within the harvest chamber. The heated water vapor is created by the solar heating of the outer wall and the liquid water dispensed by the water delivery device within the annular void. The enriched gas is provided as a product stream through a product outlet in fluid communication with the inside of the harvest chamber. Moving from the closed configuration to the open configuration includes the lower lid rising up the inner cylinder. The open configuration further includes the lower lid blocking the opening of the inner cylinder while the capture structure is in the open configuration such that the loss of heated water vapor from the inner cylinder is reduced. The harvest chamber further includes a solar coating on an exterior surface, the solar coating configured to increase the absorption of sunlight to heat the outer wall of the harvest chamber.

Particular embodiments may comprise one or more of the following features. The capture structure may include a plurality of collapsible supports and a plurality of disks coupled to and spaced along the plurality of collapsible supports. Each disk may have the sorbent material. The closed configuration may include the plurality of collapsible supports of the capture structure being collapsed inside the harvest chamber. The lower lid may be sized like a disk of the plurality of disks and may be coupled to the plurality of collapsible supports beneath the plurality of disks. The open configuration may include the lower lid being elevated below the plurality of disks and positioned inside the opening of the inner cylinder such that the loss of heated water vapor from the inner cylinder is reduced. The device may further include a plurality of shades positioned outside the harvest chamber and coupled to the upper lid. Moving from the closed configuration to the open configuration may include the plurality of shades being elevated with the capture structure. The open configuration may further include the plurality of shades being positioned to shield the sorbent material of the capture structure from direct exposure to sunlight while allowing the outer wall of the harvest chamber to be exposed to sunlight. The closed configuration may further include the plurality of shades being lowered and collapsed such that the outer wall of the harvest chamber remains exposed to sunlight. The inner wall may include a plurality of return vents proximate the top of the annular void. The annular void may be in fluid communication with the inner cylinder through the plurality of return vents. The harvest chamber may further include an upper flange around the perimeter of the opening. The closed configuration may further include the lower lid pressed against an interior surface of the upper flange. The interior surface may face toward the inner cylinder. The lower lid may further include an aperture and a cover that may be wider than the aperture and on top of the lower lid. The open configuration may further include the cover resting on top of the aperture such that the flow of heated water vapor through the aperture from beneath the lower lid is prevented such that the loss of heated water vapor from the inner cylinder is reduced. Moving from the open configuration to the closed configuration may include the lower lid being lowered onto a protrusion inside the inner cylinder. The protrusion may pass through the aperture and may lift the cover off of the lower lid. The closed configuration may further include the cover being raised off of the aperture by the protrusion such that heated water vapor can flow through the aperture from beneath the lower lid. The device may further include a fan inside the inner cylinder, and may be positioned above the water filled sump and below the capture structure. The fan may be configured to increase movement of the heated water vapor within the harvest chamber. The at least one water applicator may be a spray nozzle. The water delivery device may include a plurality of water applicators. Each water applicator of the plurality of water applicators may be located within a different segment of the annular void and may be configured to dispense liquid water onto the surface of at least one of the inner wall and outer wall within that segment of the annular void. The device may further include at least one sensor communicatively coupled to the water delivery device. The water delivery device may be configured to dispense liquid water to a segment of the annular void through a water applicator within said segment in response to a condition detected on the outer wall of said segment by the at least one sensor. The condition may be at least one of a temperature and a sunlight exposure. The water delivery device may be configured to dispense liquid water to a segment of the annular void through a water applicator within said segment in response to a timer.

According to yet another aspect of the disclosure, a device for passive collection of atmospheric carbon dioxide includes a harvest chamber having an inner wall forming an inner cylinder with an opening, an outer wall, an annular void between the inner wall and outer wall, and a water-filled sump at the bottom of the harvest chamber connecting the annular void and the inner cylinder. The device also includes a capture structure coupled to the harvest chamber and having a sorbent material. The capture structure is movable between an open configuration and a closed configuration and has a plurality of collapsible supports and a plurality of disks coupled to and spaced along the plurality of collapsible supports, each disk having the sorbent material. The device includes an upper lid positioned above the capture structure, the upper lid coupled to the capture structure. The device further includes a water delivery device having a plurality of water applicators and a water pump, each water applicator of the plurality of water applicator positioned within the annular void proximate the top of the annular void and located within a different segment of the annular void, each configured to dispense liquid water onto the surface of at least one of the inner wall and outer wall within that segment of the annular void. The water pump is in fluid communication with the water-filled sump and configured to transfer liquid water from the water-filled sump to the plurality of water applicators. The device also includes a lower lid coupled to the capture structure and positioned below the capture structure such that the capture structure is between the lower lid and the upper lid. The open configuration includes the capture structure extending upward from the harvest chamber to expose at least a portion of the capture structure to an airflow and allow the sorbent material to capture atmospheric carbon dioxide, with the capture structure expanded to occupy a collection volume. The closed configuration includes the capture structure collapsed to occupy a regeneration volume that is smaller than the collection volume, with the upper lid covering the opening of the inner cylinder. The capture structure is sufficiently enclosed inside the inner cylinder that a heated water vapor operates on the sorbent material of the capture structure to release captured carbon dioxide from the sorbent material to form an enriched gas within the harvest chamber. The heated water vapor is created by the solar heating of the outer wall and the liquid water dispensed by the water delivery device within the annular void. The enriched gas is provided as a product stream through a product outlet in fluid communication with the inside of the harvest chamber. Moving from the closed configuration to the open configuration includes the lower lid rising up the inner cylinder. The open configuration further includes the lower lid blocking the opening of the inner cylinder while the capture structure is in the open configuration such that the loss of heated water vapor from the inner cylinder is reduced. The harvest chamber further includes a solar coating on an exterior surface, the solar coating configured to increase the absorption of sunlight to heat the outer wall of the harvest chamber.

Particular embodiments may comprise one or more of the following features. The harvest chamber may further include an upper flange around the perimeter of the opening. The closed configuration may further include the lower lid pressed against an interior surface of the upper flange. The interior surface may face toward the inner cylinder. The lower lid may further include an aperture and a cover that may be wider than the aperture and on top of the lower lid. The open configuration may further include the cover resting on top of the aperture such that the flow of heated water vapor through the aperture from beneath the lower lid is prevented such that the loss of heated water vapor from the inner cylinder is reduced. Moving from the open configuration to the closed configuration may include the lower lid being lowered onto a protrusion inside the inner cylinder. The protrusion may pass through the aperture and may lift the cover off of the lower lid. The closed configuration may further include the cover being raised off of the aperture by the protrusion such that heated water vapor can flow through the aperture from beneath the lower lid. The device may further include a fan inside the inner cylinder, positioned above the water filled sump and below the capture structure. The fan may be configured to increase movement of the heated water vapor within the harvest chamber. The at least one water applicator may be a spray nozzle. The device may further include at least one sensor communicatively coupled to the water delivery device. The water delivery device may be configured to dispense liquid water to a segment of the annular void through a water applicator within said segment in response to a condition detected on the outer wall of said segment by the at least one sensor. The condition may be at least one of a temperature and a sunlight exposure. The water delivery device may be configured to dispense liquid water to a segment of the annular void through a water applicator within said segment in response to a timer. The harvest chamber may further include an upper flange around the perimeter of the opening. The closed configuration may further include the lower lid pressed against an interior surface of the upper flange. The interior surface may face toward the inner cylinder. The lower lid may be sized like a disk of the plurality of disks and may be coupled to the plurality of collapsible supports beneath the plurality of disks. The open configuration may include the lower lid being elevated below the plurality of disks and positioned inside the opening of the inner cylinder such that the loss of heated water vapor from the inner cylinder is reduced.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1A:
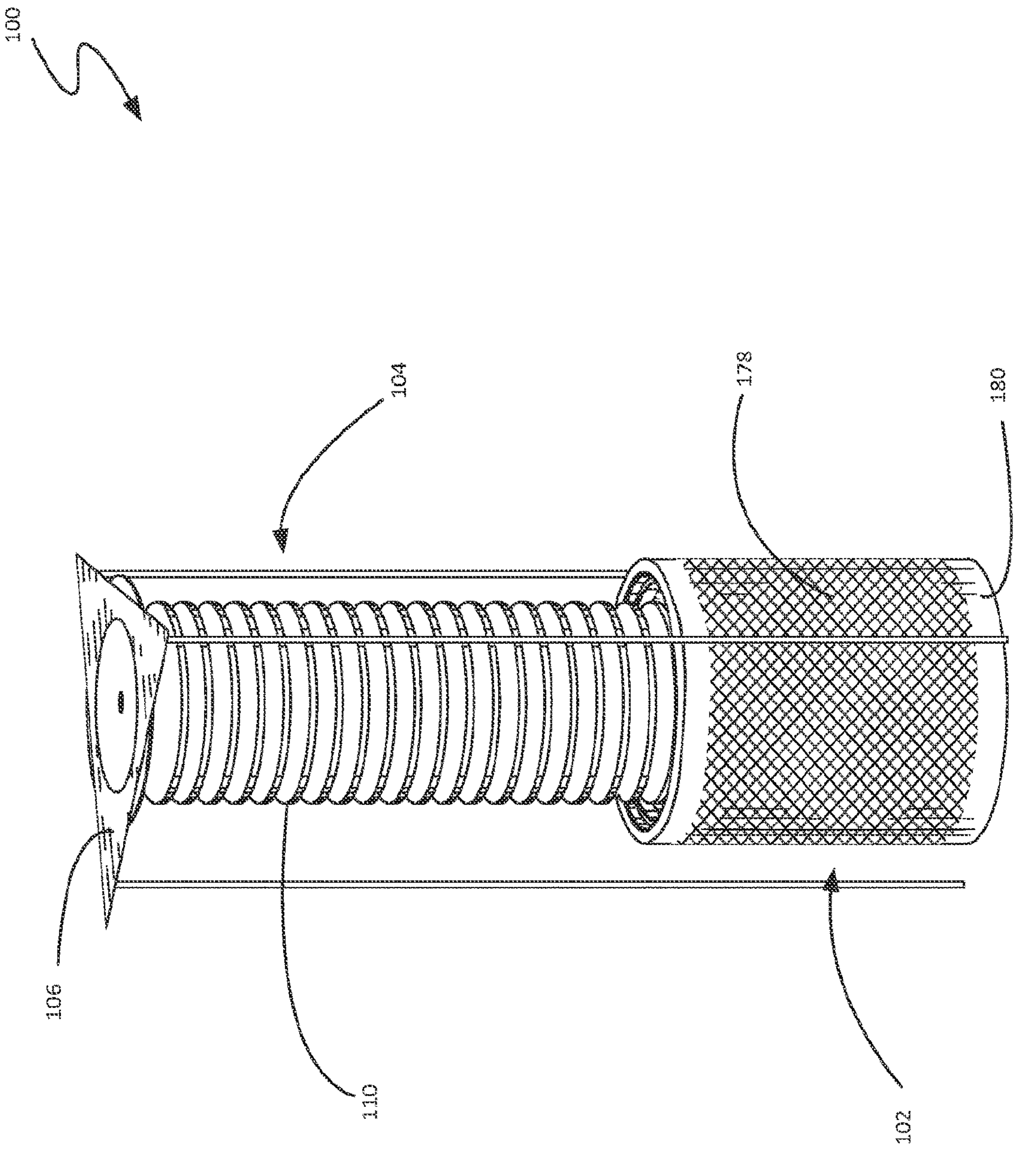
FIG. 1A shows a perspective view of a DAC device with a double-walled harvest chamber.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis.

Capture of carbon dioxide from ambient air at an affordable price could become a critical tool in managing the anthropogenic carbon cycle. Air capture technology would greatly enhance the options for developing the world's energy infrastructure and would be a major asset in the fight against climate change. Combined with carbon dioxide storage technologies, air capture of $CO_2$ could compensate for $CO_2$ emissions from any source, without requiring changes to the existing infrastructure and without requiring proximity to the point of emission. Air capture technology would make it possible for existing infrastructures to live out their natural life spans, and would permit the continued use of carbon-based fuels in distributed and mobile applications, for example in the transportation sector.

Nevertheless, these technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk. In particular, actively heating or cooling the air, drying the air, or significantly changing the air pressure using conventional methods would exceed any reasonable energy budget. Additionally, conventional carbon dioxide collection systems often exhibit the unfortunate combination of being costly and fragile. Conventional capture devices also often have a large initial capital cost along with a high operating cost.

A promising technology that is well adapted for capturing dilute atmospheric carbon dioxide in an energy efficient manner is passive direct air capture, or passive DAC, which is distinguished from other DAC technologies which require additional energy for the forced convection of air. Air contactor surfaces that comprise sorbent materials are exposed to passive atmospheric air flows, capturing carbon dioxide with the sorbent material to be released within an appropriate context for further processing, use, and/or storage.

Although drastically reduced compared to conventional systems, direct air capture still must operate on a tight energy budget. For many sorbent materials, the use of hot water vapor can lead to better performance. However, providing that heat with conventional methods can quickly exceed the energy budget.

Contemplated herein is a device and method for the passive collection of atmospheric carbon dioxide using a double-walled harvest chamber. The contemplated direct air capture (hereinafter "DAC") device makes use of a harvest chamber having a double wall and a water-filled sump at the bottom. Advantageously, this allows the harvest chamber to produce heated water vapor to regenerate $CO_2$-laden moisture-swing sorbent materials without significantly increasing the power requirements. The use of water vapor at elevated temperatures allows this novel device to achieve the optimal yields for the capture/release cycle.

This technology has a wide range of environmental engineering applications including, but not limited to, a component of a system for optimizing the removal of carbon dioxide gas from the atmosphere, outdoor/indoor systems, and even for breathable oxygen scrubbing (purification) in closed atmospheric environments. Embodiments of the contemplated DAC device may be combined with many different technologies for processing the harvested carbon dioxide, including systems that convert the collected carbon dioxide gas into usable and renewable fuel sources for later purposes, as well as systems that use carbon dioxide as a feedstock for other materials and processes.

It is important to note that while the contemplated double-walled harvest chamber and the methods for its use, are being discussed in the context of a DAC having a particular design, it may be adapted for use with other DAC devices making use of moisture-swing or thermal-swing sorbent materials. Details such as the use of sorbent disks and collapsible supports, the number of sorbent disks, their size and shape, how they are suspended, how they are lifted into a collection or open configuration, the use of shades, and other aspects of the non-limiting example of a DAC device discussed below may be modified without straying from the spirit of the contemplated double-walled harvest chamber. Those skilled in the art will also recognize that elements of the contemplated device may be adapted for use with other passive and active air capture devices, or similar technologies.

Figure 1B:
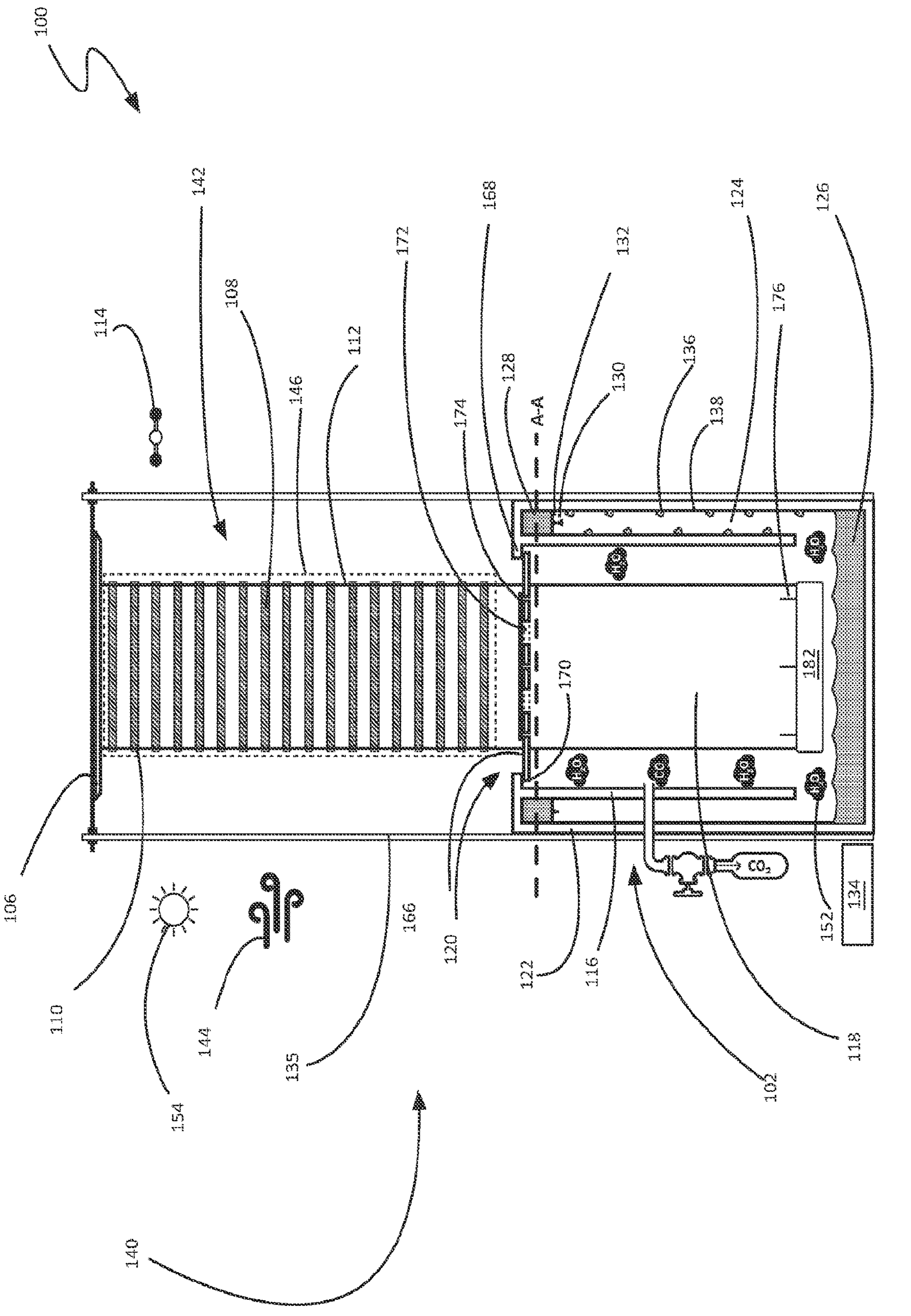
FIGS. 1B and 1C show cross-sectional views of a DAC device with a double-walled harvest chamber in open and closed configurations, respectively.
Figure 1C:
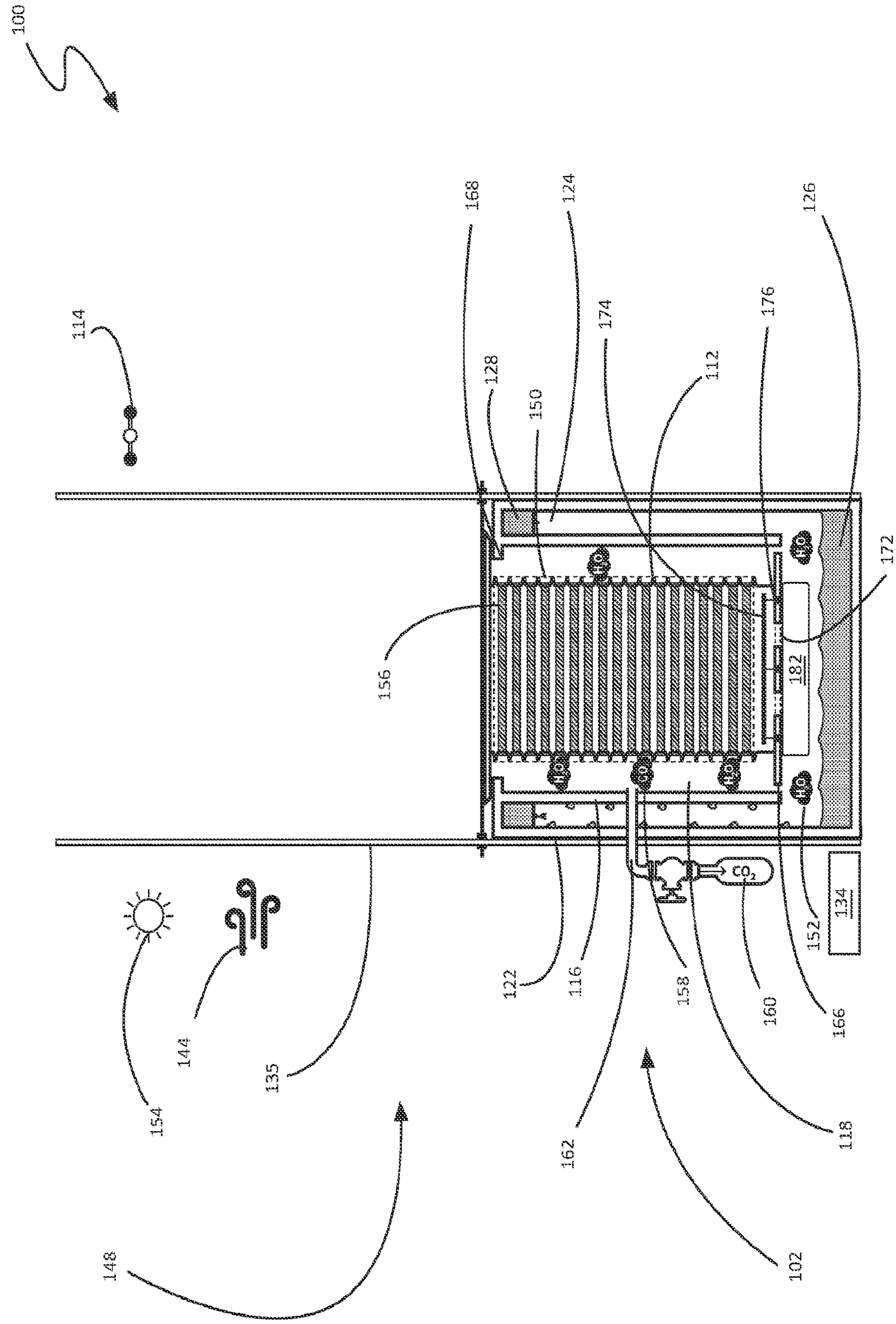
Figure 1D:
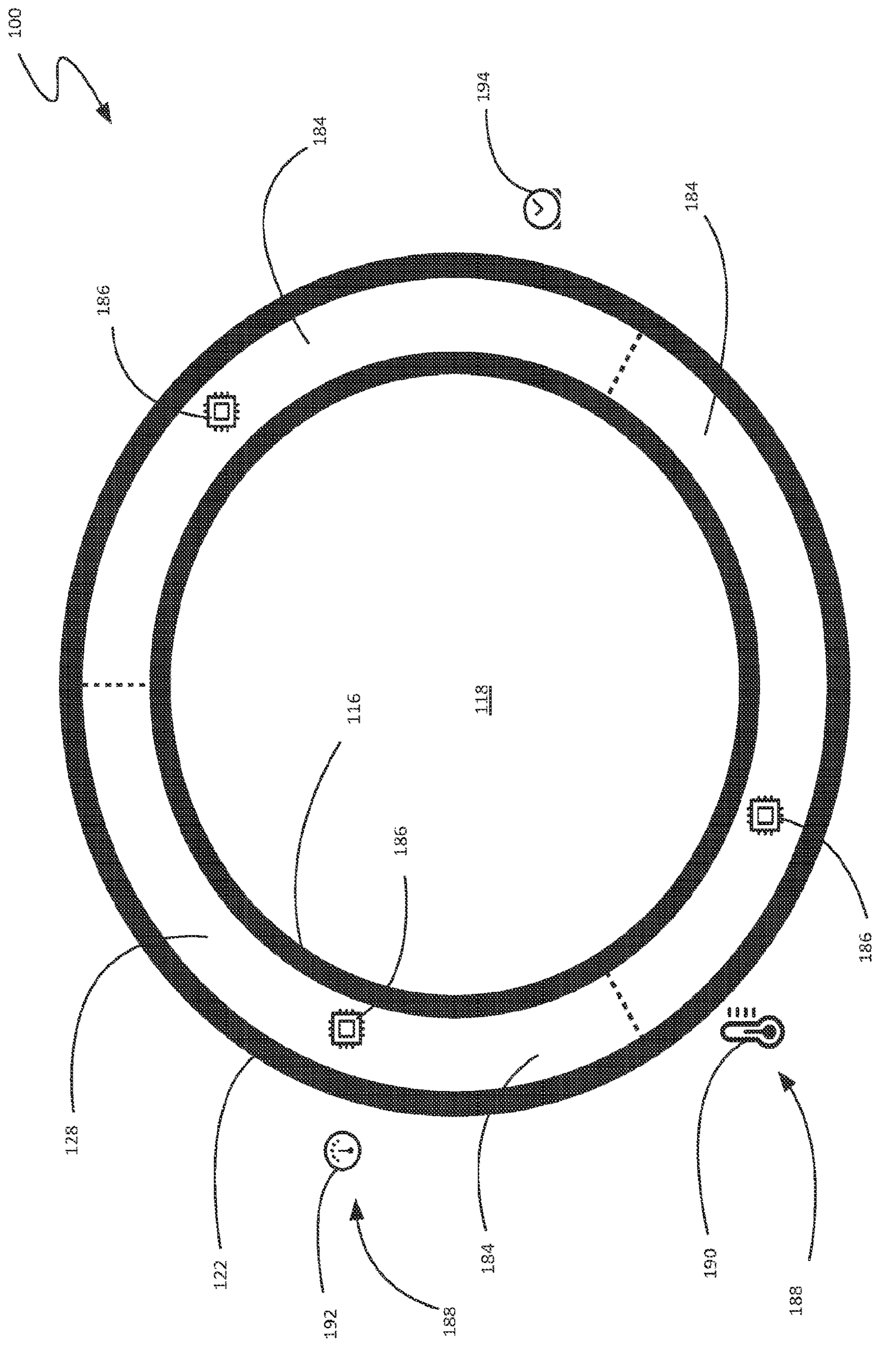
FIG. 1D shows a cross-sectional view along A-A of the DAC device of FIG. 1B.
Figure 1E:
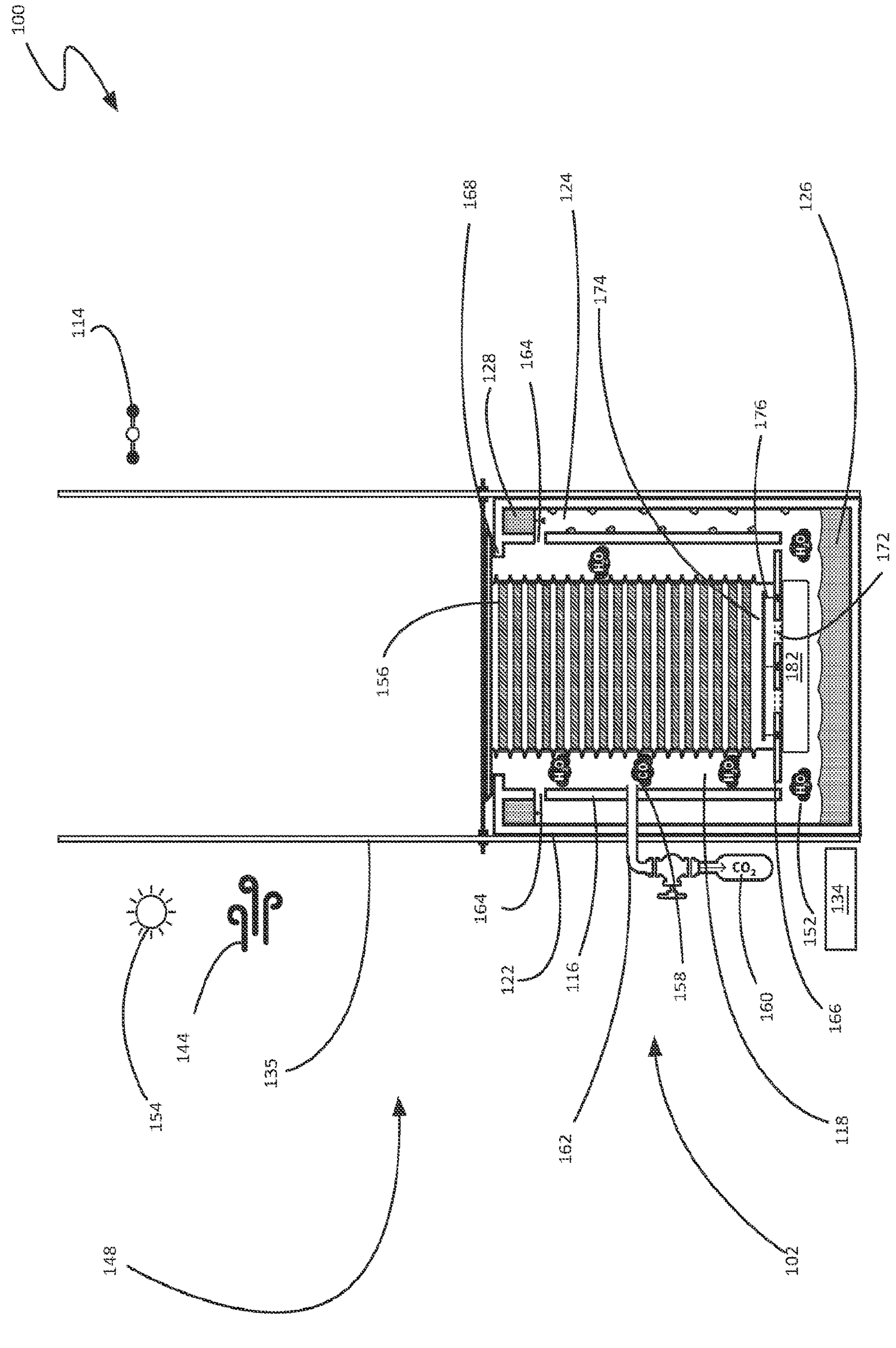
FIG. 1E shows a cross-sectional view of a DAC device having return vents, in the closed configuration.

FIGS. 1A through 1D are various views of a non-limiting example of a device 100 for passive collection of atmospheric carbon dioxide having a double-walled harvest chamber 102. Specifically, FIG. 1A is a perspective view of the DAC device 100. FIGS. 1B and 1C show a side cross-sectional view of a non-limiting example of a DAC device 100 in open and closed configurations, respectively. FIG. 1D shows a top cross-sectional view along A-A of the DAC device 100 in FIG. 1B. FIG. 1E shows a side cross-sectional view of a non-limiting example of a DAC device 100 having return vents 164, in the closed configuration 148. The contemplated architecture has many advantages over conventional capture devices. According to various embodiments, it is energy efficient, durable, and capable of being adapted for use in a variety of environments.

The open configuration 140 may also be referred to as a "sailing" or collection configuration. The closed configuration 148 may also be referred to as a harvest or regeneration configuration. These configurations will be discussed in greater detail, below. Furthermore, while these figures, and much of the following discussion will deal with the DAC device 100 in open and closed configurations 148, it should be noted that in some embodiments, the DAC device 100 may be movable into additional configurations other than open and closed.

As shown, the contemplated DAC device 100 comprises a capture structure 104 configured to expose a sorbent material 108 to natural airflows 144, a double-walled harvest chamber 102 or double-walled regeneration chamber (hereinafter referred to simply as harvest chamber 102) into which the capture structure 104 may be placed through an opening 120, an upper lid 106 to seal or otherwise enclose the capture structure 104 inside the harvest chamber 102 when in a closed configuration 148, and a means of extracting the $CO_2$ enriched gas 158 from within the chamber through a product outlet 162.

In some embodiments, including the non-limiting example shown in FIGS. 1A-1E, the device 100 way also include a lower lid 166 to seal or otherwise enclose the harvest chamber 102 to prevent or minimize energy and/or mass transfer to the atmosphere when the device 100 is in an open configuration 140.

In the context of the present description and the claims that follow, a harvest chamber 102 is an enclosure within which captured carbon dioxide 156 is released for subsequent sequestration, refinement, or application. The harvest chamber 102 has an opening 120 through which it receives captured carbon dioxide 156 and the material in which it is captured (e.g., the capture structure 104 and its sorbent material 108, etc.). The contemplated harvest chamber 102 has a double wall, resembling a jacketed cylinder, with an inner wall 116 and an outer wall 122. In some embodiments, the inner wall 116 and the outer wall 122 may be the same thickness. In other embodiments, these walls may have different thicknesses.

The inner cylinder 118 of the harvest chamber 102 is essentially a tube sized and shaped to receive the capture structure 104 through its opening 120 when the device 100 is in the closed configuration 148, as shown in FIG. 1C. In some embodiments, the inner cylinder 118 may have an upper flange 168 or lip against which the upper lid 106 (and, in some embodiments, a lower lid 166) may be pressed or rested to achieve a satisfactory seal.

It should be noted that while the inner cylinder 118 is referred to as a cylinder and is being depicted as having a circular cross-section, other embodiments may comprise an inner cylinder 118 having a wide range of cross-sectional shapes.

As previously mentioned, the upper lid 106 serves to enclose the capture structure 104 inside the harvest chamber 102 for regeneration. More specifically, the upper lid 106 covers the opening 120 of the inner cylinder 118 after the capture structure 104 has entered the inner cylinder 118. According to various embodiments, the upper lid 106 is positioned above the capture structure 104. In some embodiments, the upper lid 106 may be coupled directly to the capture structure 104, which allows the capture structure 104 to be lifted out of the inner cylinder 118 by raising the upper lid 106. In other embodiments, the upper lid 106 may be positioned above the capture structure 104 only when it is in the closed configuration 148 (i.e., inside the inner cylinder 118), and moves out of the way to allow the capture structure 104 to rise up and move into the open configuration 140. In other embodiments, the upper lid 106 may be coupled to the capture structure 104 through one or more other elements, and not through a direct connection.

The space between the inner cylinder 118 and an outer cylinder (i.e., the space between the inner wall 116 and the outer wall 122) is an annular void 124 which is used to provide heated water vapor 152 at minimal energy cost. Again, while this annular void 124 void is depicted as having a circular cross-section, it may have a wide range of shapes, just like the inner cylinder 118 it wraps around.

At the top of this annular void 124 is a water delivery device 128, which causes liquid water 136 to run down the surfaces 138 inside of the annular void 124. Specifically, the liquid water 136 runs down the inward-facing surface of the outer wall 122 and the outward-facing surface of the inner wall 116.

At the bottom of the harvest chamber 102 is a water-filled sump 126, which connects the annular void 124 and the inner cylinder 118, according to various embodiments. The water delivery device 128 and the water-filled sump 126 will each be discussed in greater detail, below.

The harvest chamber 102 may be constructed of a durable material appropriate for both the external environment in which the DAC device 100 is being employed, as well as the internal environment inherent to its operation (e.g., the heated water vapor 152, etc.). In some embodiments, the harvest chamber 102 may be constructed using different materials for the outer cylinder (or annular void 124) and inner cylinder 118.

The DAC device 100 contemplated herein is advantageous over conventional devices because it is able to efficiently harness environmental heat, such as solar energy. It should be noted that while the following discussion is done in the context of using solar heating to generate the heated water vapor 152 to regenerate the sorbent material 108, in other embodiments other external sources of heat may be used, without relying on electricity or other forms of heating used by less efficient conventional devices. Examples include, but are not limited to, waste heat from industrial and biological processes, geothermal heat, heat stored in urban materials like asphalt, and the like.

In some embodiments, the harvest chamber 102 may be enhanced to increase the efficiency with which this inexpensive (or free) energy is absorbed to heat the outer wall 122. According to various embodiments, at least the exterior surface 180 of the harvest chamber 102 may be coated with a material (hereinafter referred to as a solar coating 178) to enhance absorption of sunlight 154, heating up the harvest chamber 102, particularly the liquid water 136 running down those surfaces 138 within the annular void 124. In some embodiments, this may simply be coloring the harvest chamber 102 black. In other embodiments, the harvest chamber 102 may be coated with black matte material having nanoscale features that enhance the absorption of light (e.g., Vantablack, nanotube-based materials, etc.). In still other embodiments, the exterior surface 180 of the harvest chamber 102, or at least a portion of it, may be modified to enhance light absorption. Rather than coating the chamber with material, in some embodiments the exterior surface 180 (or a portion of the exterior surface 180) may be modified by removing or ablating material. As a specific example, in one embodiment, at least a portion of the exterior surface 180 of a harvest chamber 102 made of metal (e.g., anodized aluminum, stainless steel, etc.) may be ablated using femtosecond laser pulses, creating a blackened, highly absorbent surface. The ultra-high energy ablation of metallic surfaces may be advantageous overusing coatings, as the resulting nanostructured surfaces may be more durable under exposure to the elements.

In the context of the present description and the claims that follow, the capture structure 104 is the structure or collection of structures upon which, or in which, atmospheric carbon dioxide 114 is captured. The capture structure 104 is coupled to the harvest chamber 102, and contains (or, in some embodiments, is made of) one or more sorbent materials 108.

As will be discussed in greater detail below, the capture structure 104 is movable between an open configuration 140 and a closed configuration 148. It should be noted that when in a collection phase (i.e., the open configuration 140), it is advantageous to maximize contact with the natural airflow 144. Conversely, when in a regeneration phase (i.e., the closed configuration 148), it is advantageous to minimize the space occupied by the capture structure 104, to reduce the regeneration medium (e.g., heat, water vapor, etc.) needed, without sacrificing fluidic contact with the sorbent materials.

According to various embodiments, as the capture structure 104 moves into the open configuration 140 to begin collecting atmospheric carbon dioxide 114, it expands to occupy a collection volume 146, as shown in FIG. 1B. As the capture structure 104 moves from the open configuration 140 to the closed configuration 148 to begin releasing the captured carbon dioxide 156, it contracts or collapses to occupy a regeneration volume 150 that is smaller than the collection volume 146.

There are variety of embodiments of the capture structure 104 that can occupy these two volumes as the cycle back and forth. It should be noted that while the following discussion will be focused on a non-limiting example of such a capture structure 104, the devices and methods contemplated herein may be adapted for use with a wide range of other types of capture structures 104.

As shown, according to various embodiments, the capture structure 104 is made up of a plurality of disks 110 coupled to and spaced along one or more collapsible supports 112. It should be noted that the collapsible supports 112 were omitted from FIG. 1A, for clarity. The disks 110 comprise one or more surfaces that are capable of capturing and later releasing carbon dioxide. These surfaces hold, or are composed of, one or more sorbent materials 108, which will be discussed further, below. In some embodiments, the sorbent material 108 may be disposed on one or more surfaces of a disk 110, while in other embodiments, the disk 110 itself may be made of sorbent material 108. As will be discussed, the sorbent material 108 releases captured carbon dioxide 156 when it is regenerated (e.g., upon application of heat and moisture inside the harvest chamber 102, etc.).

The capture structure 104 also comprises a means by which the disks 110 are suspended or supported. According to various embodiments, these sorbent disks 110 are suspended from the upper lid 106 by one or more collapsible supports 112. When the capture structure 104 moves into the closed configuration 148, these collapsible supports 112 collapse into the harvest chamber 102, allowing the capture structure 104 to occupy the smaller regeneration volume 150 and fit entirely inside of the inner cylinder 118.

In the context of the present description, a sorbent disk 110 is a structure made of, or able to hold, a carbon dioxide sorbent material 108, such as a moisture-swing material, heat-swing material, and the like. It should be noted that while the following discussion and figures depict the sorbent disks 110 as flat and circular, the methods and structures contemplated herein may be adapted for sorbent disks 110 of any shape. For example, in one embodiment, the disks 110 may have a hole in their center, forming a central passage allowing air to be blown by a fan 182 up through the stack when in the closed configuration 148.

As shown, when the capture structure 104 is "deployed" (i.e., moved into the open configuration 140) and exposed to the atmosphere to collect carbon dioxide (see FIG. 1B), the disks 110 are suspended along one or more collapsible supports 112 such that air may flow between the disks 110 from any direction. Such an arrangement is advantageous when used to capture $CO_2$ from natural airflow 144 and wind, which may shift in direction. Furthermore, while the disk-based structures contemplated herein are described in the context of use in a passive air flow, it should be understood that they may also be used with a driven air flow as well.

The non-limiting example of a capture structure 104 shown in FIGS. 1B and 1C is tall and cylindrical, and makes use of circular disks 110. In some embodiments, the device 100 and/or the disks 110 may have a roughly circular cross-section, which may be advantageous for use in passive air capture in conditions where the air flow could come from any direction. In other embodiments, the device and/or disks 110 may have a non-circular cross-section.

While the term disk 110 is derived from one possible design where disks 110 are flat, it is important to note that in the context of the present disclosure, the term disk 110 is intended to accommodate a much broader range of geometries. In some embodiments, disks 110 are made entirely out of sorbent material 108, while in others they are made from structural material that hold sorbent material 108 in place. For example, in some embodiments, liquid sorbents (e.g., ionic liquids) may be used by wetting structural surfaces of the disk. As a particular example, foam materials may be employed in conjunction with liquid sorbents.

As shown, the capture structure 104 comprises a stack of disks 110. According to various embodiments, the capture structure 104 stack could range from a few (5 to 10) disks 110 to a large number (>1000). Particular embodiments make use of stacks between 50 and 200 disks 110.

According to various embodiments, the DAC device 100 can be used with a wide range of sorbent materials 108 that can be regenerated by heat and/or moisture, including solid sorbents and liquid sorbents. The sorbents can be made from inorganic materials or from organic materials, and could also be composites. Sorbents could be materials that bind $CO_2$ chemically or physically, i.e., they could be absorbers. They also could be adsorbents that bind $CO_2$ on internal surfaces, for example inside porous structures, or on fiber surfaces. In some embodiments, the disks 110 may comprise a fabric or fabric-like material made of, or holding, a sorbent material 108.

In some embodiments, the sorbent material 108 can be selective for a single sorbate, while in other embodiments the sorbent may interact with multiple sorbates that cooperate or compete with each other. Sorbents could be autocatalyzing their own absorption in some embodiments.

As a specific example, the sorbent material 108 may be one of a number of anionic exchanges resins that have a strong affinity to $CO_2$ when they are dry, and lose this affinity when they are wet. These are strong base-exchange resins, exemplified by polystyrenes with quaternary ammonium ions attached to the styrene structure. They are known as moisture swing sorbents. Moisture swing sorbents can be used with moisture alone, or with a combination of moisture (e.g., fog or other droplet forms, vapor, etc.) and temperature. Advantageously, the elevated temperature provided by the contemplated harvest chamber 102 increases the efficiency of the moisture swing.

According to various embodiments, these sorbent disks 110 are supported by one or more collapsible supports 112 that, when raised, allow the disks 110 to hang so that air can pass through the gaps between them. In many embodiments, the disks 110 rest on each other when the capture structure 104 is collapsed inside the harvest chamber 102, using small risers or other structure to maintain a small gap between the disks 110 when they are at rest within the harvest chamber 102. In some embodiments, the gap between disks 110 while in the closed configuration 148 may be maintained by the collapsible supports 112 themselves.

A number of methods and structures may be used to hold the disks 110 in the open configuration 140, and move the disks 110 between the open and closed configurations. For example, in some embodiments, a rigid system (e.g., hydraulics, tracks, actuators, etc.) may be used. However, these systems tend to be bulky and heavy. Suspending the disks 110 from the upper lid 106 by a plurality of collapsible supports 112, and moving the lids and disks 110 up and down is far simpler and more flexible than the rigid systems.

In other embodiments, the disks 110 may be coupled to, and spaced along, a single, central collapsible support 112. In still other embodiments, the disks 110 may be suspended using multiple collapsible supports 112 including, but not limited to, ropes, lines, cables, and chains. In one embodiment, each disk may be connected to the one above, and thereby carries the weight of all the disks 110 below it. In another embodiment, the collapsible support 112 is continuous, and designed to carry all the weight of the disks 110, whereas the disk structure is designed to only carry its own weight.

In another embodiment, the disks 110 may be held up by telescoping tubes or rigid rods that fold in zig-zag pattern tangential to the disks 110, creating "Dog-bone" shapes that protrude from the bottom disk into an open space in the disks 110 above. In this design it may be necessary to have consecutive disks 110 anchored at different locations shifted by a few degrees to make room for the length of the dog-bone to not interfere with that of the disk above.

According to various embodiments, the disks 110 of a DAC device 100 are separated from each other when in an open configuration 140 or phase, and are stacked on top of each other in a regeneration or closed phase. As an option, the sensitive portions of the disks 110 may be protected from contacting other disks 110 by a buffer structure, such as a pad or rim. Buffering might be structured in such a manner as to help direct air flows to enhance collection and/or harvest.

In some embodiments, including the non-limiting example shown in FIGS. 1B-2B, the collapsible supports 112 may be straps. In the context of the present description, a strap is a flexible or semi-flexible collapsible support 112 that are substantially wider than they are thick. Examples include, but are not limited to, nylon webbing, woven fabric, chains having flattened links, strips, ribbons, and the like. According to various embodiments, these straps have much higher strength than ropes, and are thin in at least in one dimension. In some embodiments, the straps may be enclosed in a sock or sleeve that runs the length of the strap, passing through a conduit in each disk.

As shown, the stack of disks 110 may be suspended from the upper lid 106 by the collapsible supports 112. The other end of the collapsible supports 112 is coupled to the harvest chamber 102, to limit the motion of the stack. In some embodiments, the collapsible supports 112 may be coupled to the bottom of the harvest chamber 102, or the sump. In other embodiments, the collapsible supports 112 may be coupled to another structure within the harvest chamber 102, such as the inner wall 116 or the fan 182.

According to some embodiments, the capture structure 104 may be raised and lowered between open and closed configurations as the upper lid 106 slides up and down on a plurality of posts 135 using a lift (not shown). Other embodiments may use other structures and mechanisms to raise and lower the stack of disks 110 into and out of the contemplated dual-wall harvest chamber 102.

The preferred conditions for unloading the captured carbon dioxide 156 from the sorbent material 108 is at elevated temperatures and, in embodiments employing moisture swing sorbents, moist conditions. This is accomplished using heated water vapor 152 within the harvest chamber 102. As shown in the Figures, at the top of the annular void 124 is a water delivery device 128. At the bottom of the harvest chamber 102 is a water-filled sump 126 or pit.

In the context of the present description and the claims that follow, a water delivery device 128 is a device that is configured to release liquid water 136 within the annular void 124 using one or more water applicators 130, such that it runs down the wall surfaces facing the annular void 124 (i.e., the inward-facing surface of the outer wall 122 and the outward-facing surface of the inner wall 116). In some embodiments, the liquid water 136 may be applied mostly, or entirely, to the inward-facing surface of the outer wall 122, which would be closest to the external heat source or a surface enhanced to harness said heat.

The water delivery device 128 comprises at least one water applicator 130. According to various embodiments, the water applicator(s) 130 may be various mechanisms including, but not limited to, spray nozzles 132, misting nozzles, mesh, foam, cloth, tubes, foggers, and other liquid dispensing mechanisms known in the art. It should also be noted that the contemplated device could be adapted for use with a different liquid regeneration medium that would benefit from heat.

In some embodiments, the water delivery device 128 may entirely fill the upper end of the annular void 124, forming a seal and preventing the loss of any water vapor to the atmosphere. In other embodiments, the water delivery device 128 may substantially fill the upper end of the annular void 124 without forming a seal, but still substantially preventing the loss of any heated water vapor 152. In still other embodiments, the top of the annular void 124 may be sealed with another structure or surface, enclosing the water delivery device 128 within the annular void 124 and preventing loss of heated water vapor 152. In a preferred embodiment, the water delivery device 128 is positioned such that the at least one water applicator 130 is positioned within the annular void 124 proximate the top of the annular void 124. In the context of the present description and the claims that follow, "proximate the top of the annular void 124" means that the water applicator 130 is closer to the top of the annular void 124 than it is to the bottom.

According to various embodiments, the water delivery device 128 (and the annular void 124) may have a plurality of water applicators 130 and may be operationally divided into multiple segments 184 such that each water applicator 130 is located within a different segment 184 of the annular void 124. Each water applicator 130 is configured to dispense liquid water 136 in such a way that it only wets the exposed surfaces 138 within that segment 184 of the annular void 124. This allows the device 100 to only dispense liquid water 136 when it will result in heated water vapor 152 (e.g., if it isn't warm enough, no point in wasting energy running the pump).

As a specific example, and as shown in FIG. 1D, in one embodiment the ring-shaped water delivery device 128 may be divided into three segments 184, each segment 184 having a spray nozzle 132 able to wet the surfaces 138 within a 120° segment of the annular void 124. It should be noted that while the non-limiting example shown in FIG. 1D has three segments 184 of equal size, in some embodiments the ring-shaped water delivery device 128 may comprise multiple segments, and those segments may have more than one size (e.g., three segments with the first being 180°, the second being 120°, and the third being 60°, etc.).

According to various embodiments, the water delivery device 128 may be configured to only wet the portions of the annular void 124 that are currently facing the sun, or are otherwise able to produce heated water vapor 152. The heat from the sun raises the temperature of the outer wall 122, creating water vapor having an elevated temperature. In some embodiments, the water delivery device 128 may have three segments 184. In other embodiments, the water delivery device 128 may have two, four, five, six, seven, eight segments 184, or more. In some embodiments, the water delivery device 128 may apply water to all surfaces 138, or just the inward-facing surface of the outer wall 122, in a continuous fashion about the circumference (e.g., water leaking out of the water delivery device 128 through a foam, etc.).

In some embodiments, the determination of which segment 184 or segments 184 should be active at a particular time may be determined by a pre-programmed timer 194. In other words, the water delivery device 128 may be configured to dispense liquid water 136 to a segment 184 of the annular void 124 through a water applicator 130 within said segment 184 in response to a timer 194 or clock.

In other embodiments, the determination of which segment 184 or segments 184 of the water delivery device 128 should be active may be performed using one or more sensors 186 configured to detect a condition 188 on the outer wall 122 of the segment(s) 184. According to various embodiments, the at least one sensor 186 is communicatively coupled to the water delivery device 128, which is configured to dispense liquid water 136 to a segment 184 of the annular void 124 through a water applicator 130 within said segment 184 in response to a condition 188 detected on the outer wall 122 of said segment 184 by the at least one sensor 186. Conditions may include, but are not limited to, a temperature 190 (e.g., thermocouple built into outer wall 122, etc.) and a sunlight exposure 192 (e.g., light meter, photodiode, etc.).

In some embodiments, this determination may be made by direct input from the sensors 186 (e.g., each segment of the water delivery device 128 has its own light sensor and gets activated when the sensor of that segment detects light above a preset intensity, etc.). In other embodiments, all of the sensors may provide input to a microcontroller which programmatically determines which segment or segments of the water delivery device 128 should be activated at a particular time.

In the context of the present description and the claims that follow, a water-filled sump 126 is a body of liquid water 136 contained in the bottom of the harvest chamber 102. In some embodiments, the water level is above the lower terminus of the inner wall 116, such that liquid water 136 is preventing the movement of gas between the annular void 124 and the inner cylinder 118. In other embodiments, the water level of the sump 126 is below the lower terminus of the inner wall 116, such that gas can move between the annular void 124 and the inner cylinder 118. Such a configuration will be discussed in greater detail with respect to FIG. 1E, below.

As shown, the water delivery device 128 is in fluid communication with the water-filled sump 126 through a water pump 134, which supplies the water delivery device 128 with liquid water 136 pulled from the sump, according to some embodiments. While in operation, liquid water 136 is pulled from the sump 126 by the pump 134 and sent to the water delivery device 128. The water delivery device 128 applies the liquid water 136 to the surfaces of the annular void 124, which are being heated by the incident sunlight 154 on the outside of the harvest chamber 102 (heating which is amplified in embodiments having enhanced absorption as previously discussed), according to various embodiments. The liquid water 136 travels down the surface 138 back to the water-filled sump 126, rising in temperature. As the cycle continues, the liquid water 136 within the DAC device 100 is heated, raising the humidity and temperature of the gas within the harvest chamber 102, creating a preferred environment for releasing captured carbon dioxide 156 from the sorbent material 108. As an option, in some embodiments, the DAC device 100 may be coupled to a source of replacement water, to maintain at least a minimum water level within the sump 126 as small amounts of water are unavoidably lost as the device 100 moves between open and closed configurations.

According to various embodiments, the DAC device 100 may also comprise at least one fan 182 located above the water level of the sump 126, and below the capture structure 104 (e.g., the stack of disks 110, etc.). This fan 182 or fans 182 are used to increase movement and create a convective current within the harvest chamber 102, facilitating the flow of heated water vapor 152 across the sorbent material 108 of the capture structure 104 when the DAC device 100 is in the closed configuration 148. The fan 182 may be elevated from the bottom of the harvest chamber 102 (as shown). It should be noted that the fan 182 is supported by the floor of the harvest chamber 102 and/or coupled to at least one of the inner wall 116 and outer wall 122, but that structure is not shown, for clarity. In some embodiments, the fan(s) 182 blow upward, while in others they blow downward.

As shown, the passive DAC device 100 also comprises a product outlet 162. The product outlet 162 allows fluid communication between the inside of the harvest chamber 102 and some structure external to the harvest chamber 102 (e.g., a storage device, an upgrade system, another harvest chamber 102, etc.), allowing for the collection of a product stream 160 that is rich in $CO_2$ (e.g., a higher ratio of $CO_2$ to other materials than is present in the ambient air, etc.). In some embodiments, such as some embodiments where the water level of the sump is above the lower terminus of the inner wall 116, said fluid communication is between the inside of the inner cylinder 118 and the external structure. In other embodiments, such as some embodiments where the water level of the sump is below the lower terminus of the inner wall 116, said fluid communication may be between the annular void 124 and/or the inner cylinder 118.

According to various embodiments, the contemplated DAC device 100's working cycle begins from an open configuration 140, where the entire stack of sorbent disks 110 (i.e., the capture structure 104) is extended above the harvest chamber 102 such that the disks 110 (or at least a portion of the capture structure 104) are exposed to natural currents of ambient air and the sorbent material 108 is allowed to capture atmospheric carbon dioxide 114. See FIG. 1B.

As previously mentioned, some embodiments of the contemplated DAC device 100 may comprise a lower lid 166 that is coupled to the capture structure 104 and positioned below the capture structure 104 such that the capture structure 104 is between the lower lid 166 and the upper lid 106. When the capture structure 104 is moving into the open configuration 140, the lower lid 166 rises up the inner cylinder 118 along with the capture structure 104. Once in the open configuration 140, the lower lid 166 blocks the opening 120 of the inner cylinder 118 while the capture structure 104 is exposed. This helps eliminate, or simply reduce, loss of heated water vapor 152 from the inner cylinder 118.

In some embodiments, the harvest chamber 102 may include an upper flange 168 or lip around the perimeter of the opening 120. This gives the lower lid 166 something to press against. As shown, while in the open configuration 140, the lower lid 166 is pressed up against the interior surface 170 (the surface facing toward the inner cylinder 118) of the upper flange 168, sealing the inner cylinder 118 and preventing or severely inhibiting any loss of thermal energy or mass from within the harvest chamber 102. Continuing with this specific example, the sorbent disks 110 capture atmospheric carbon dioxide as they dry, with air flowing through the gaps between disks 110.

The work cycle continues as the capture structure 104 is lowered into the harvest chamber 102 through the opening 120. As the upper lid 106 descends, the lower lid 166 also descends, unsealing the opening 120 and allowing the capture structure 104 (e.g., the disks 110, etc.) to pass through. The capture structure 104 continues to descend until it is entirely within the inner cylinder 118. In some embodiments, the stack of disks 110 may be rest upon and be supported by the fan(s) 182 placed between the lower lid 166 and the water-filled sump 126, said fan(s) 182 having sufficient structure to support the weight of the disks 110. In other embodiments, the stack of disks 110 may rest upon another structure that is above or level with the fan(s) 182 (e.g., a lower flange of the inner cylinder 118, protrusions from the inward-facing surface of the inner wall 116, protrusions extending upward from the bottom of the harvest chamber 102, etc.).

The capture structure 104 continues to descend until the upper lid 106 is resting on the top side of the upper flange 168, covering the opening 120 and sealing the inner cylinder 118, thereby preventing or severely inhibiting any loss of thermal energy or mass from within the harvest chamber 102. According to various embodiments, the closed configuration 148 includes the capture structure 104 being sufficiently enclosed inside the inner cylinder 118 that a heated water vapor 152 operates on the sorbent material 108 of the capture structure 104 to release captured carbon dioxide 156 from the sorbent material 108 to form an enriched gas 158 within the harvest chamber 102.

Continuing with the specific example of a disk-based capture structure 104, while the disks 110 are sealed within the inner cylinder 118, the heated water vapor 152 inside the harvest chamber 102 interacts with the moisture swing sorbent material 108, causing the captured carbon dioxide 156 to be released, regenerating the sorbent and preparing it to capture additional carbon dioxide once returned to the drier and/or cooler exterior. This release and regeneration due to the steam interacting with the sorbent disks 110 is enhanced by the flow caused by the fan(s) 182, according to some embodiments.

In some embodiments, the lower lid 166 may be solid. In other embodiments, including the non-limiting example shown in FIGS. 1B and 1C, the lower lid 166 comprises at least one aperture 172 through which gases within the harvest chamber 102 may flow as they are moved (e.g., by the fan(s) 182, etc.). In some embodiments, the lower lid 166 also comprises a cover 174 on top of the lower lid 166 that is wider and extends beyond the aperture 172. In some embodiments, the cover 174 may be slightly larger than the fan 182 below the lower lid 166. As shown in FIG. 1B, when the DAC device 100 is in the raised or open configuration 140 and the lower lid 166 is pressed up against the upper flange 168, the cover 174 is resting on top of the lower lid 166, covering the aperture(s) 172 and keeping the heated water vapor 152 within the chamber.

Furthermore, as shown in FIG. 1C, when the DAC device 100 is in the closed configuration 148 and the lower lid 166 is resting on the fan(s) 182 or some other structure, the cover 174 is raised above the lower lid 166, allowing the fan 182 to cause flow through the aperture(s) 172, facilitating the interaction between the heated water vapor 152 and the surfaces of the capture structure 104 (e.g., the sorbent disks 110, etc.). FIG. 1C shows a non-limiting example of a protrusion 176 mounted to the fan 182. According to various embodiments, when moving from the open configuration 140 to the closed configuration 148, the lower lid 166 may be lowered onto a protrusion 176 inside the inner cylinder 118, with the protrusion 176 passing through the aperture 172 and lifting the cover 174 off of the lower lid 166 such that it is not resting on the lower lid 166 and blocking flow through the aperture 172 from beneath the lower lid 166. In other embodiments, other mechanisms may be used to prevent the cover 174 from blocking flow through the aperture(s) 172 while in the closed configuration 148 including, but not limited to, suspending the cover 174 from disk(s) above the lower lid 166.

In some embodiments, the inner wall 116 may be contiguous about the circumference of the annular void 124. In other embodiments, there may be a series of return vents 164 that allow the air circulated by the fan 182 or convection to pass through the annular void 124. FIG. 1E is a side cross-sectional view of a non-limiting example of a DAC device 100 in the closed configuration 148, having a plurality of return vents 164 in the inner wall 116. In the embodiment shown, the return vents 164 are proximate the water delivery device 128 (i.e., proximate the top of the annular void 124), at the upper end of the harvest chamber 102. This places the annular void 124 in fluid communication with the inner cylinder 118 through the plurality of return vents 164. In other embodiments, the return vents 164 may be located elsewhere in the inner wall 116. As a specific example, in one embodiment, the return vents 164 may be at the top (i.e., as shown in FIG. 1E), and the fan 182 may be configured to blow air upward, through the return vents 164, and back down the annular void 124, picking up heat and moisture.

The contemplated DAC device 100 may be operated as a batch process, collecting $CO_2$ during the open phase, and releasing it during the closed phase. Before moving from the closed configuration 148 back to the open configuration 140, the $CO_2$-rich gas (i.e., enriched gas 158) within the harvest chamber 102 is extracted through the product outlet 162 as a product stream 160, according to various embodiments. This may be accomplished in a number of ways including, but not limited to, displacement with a sweep gas (e.g., inert gas from a supply, atmospheric air, water vapor, etc.), evacuation using a compressor (which offers the additional benefit of condensing the water vapor from the product stream 160 for recovery and reuse as liquid water 136), and other methods known in the art.

Figure 2A:
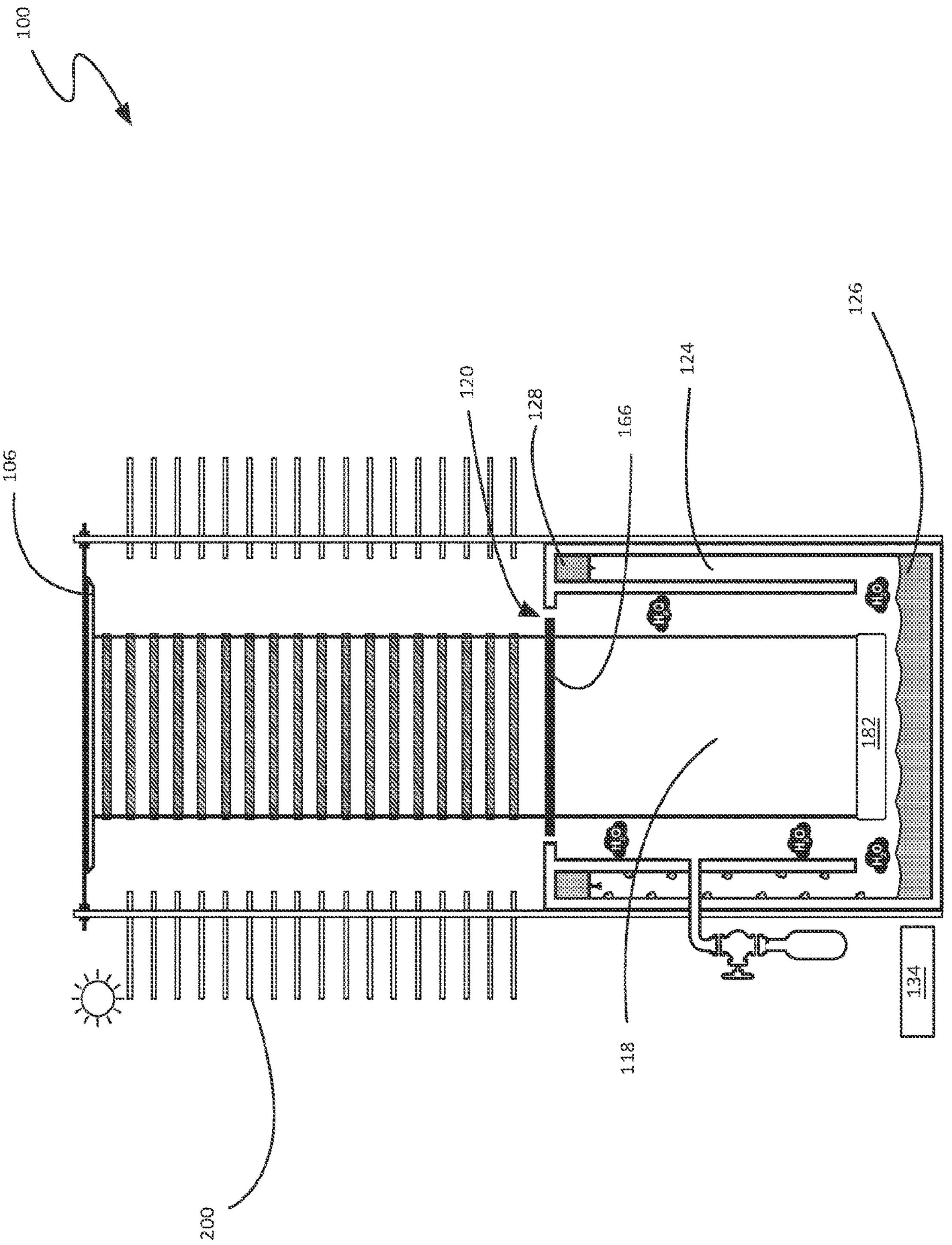
FIGS. 2A and 2B show cross-sectional views of a DAC device with a double-walled harvest chamber and shades in open and closed configurations, respectively.
Figure 2B:
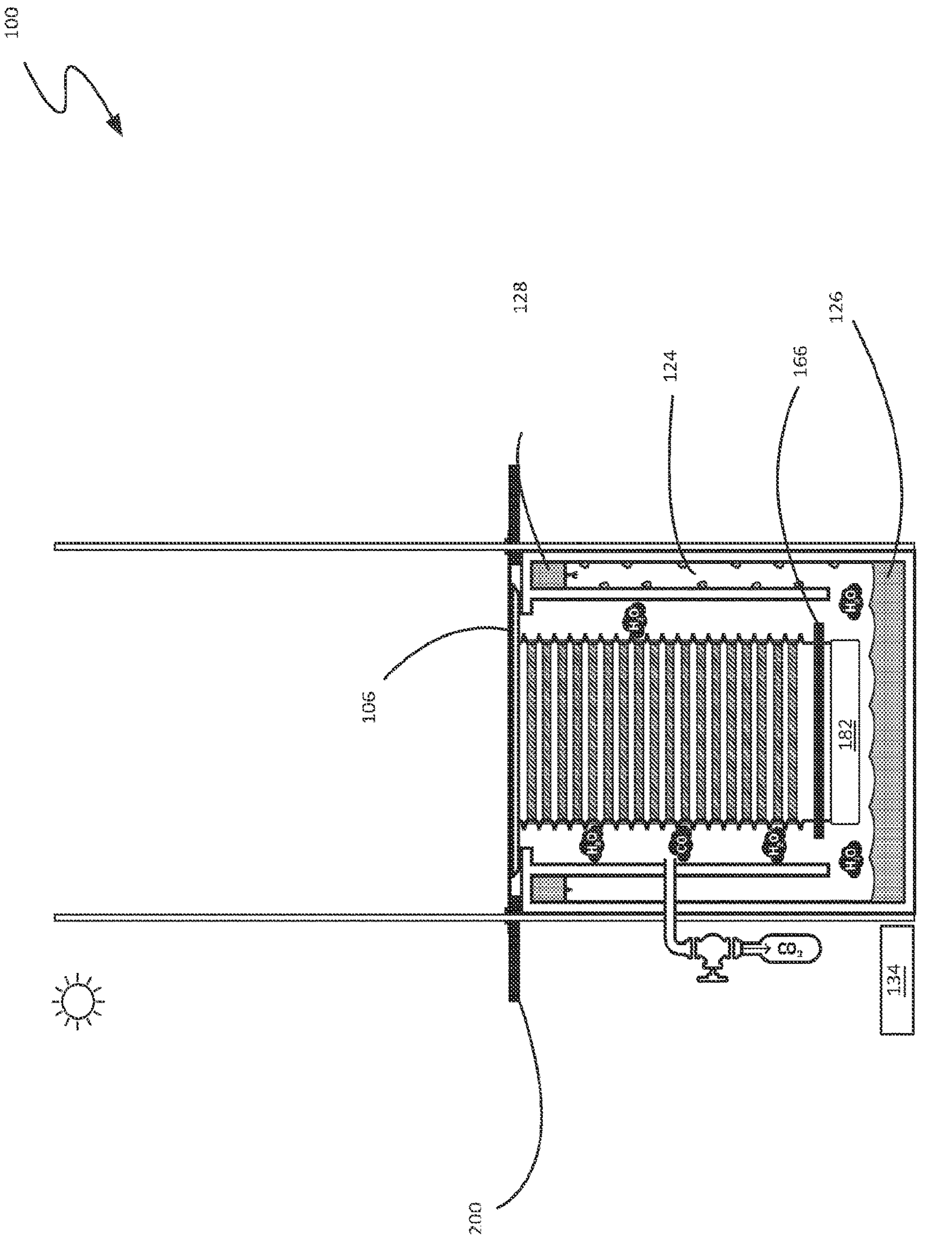

FIGS. 2A and 2B are side cross-sectional views of a non-limiting example of a DAC device 100 having a double-walled harvest chamber 102 and a plurality of shades 200. The shades 200 are positioned to protect the sorbent material 108 from direct exposure to damaging UV light while outside of the harvest chamber 102, while still allowing the outer wall 122 of the harvest chamber 102 to be exposed to sunlight 154. In some embodiments, the shades 200 may also be used to direct the flow of air between the disks 110 while in the open configuration 140.

In some embodiments, the shade 200 or shades 200 may be in fixed positions with respect to the harvest chamber 102. In other embodiments, including the non-limiting example shown in FIGS. 2A and 2B, the shades 200 may be configured to move along with the capture structure 104 (e.g., sorbent disks 110, etc.), such that the sorbent material 108 is protected throughout the work cycle. In some embodiments, this may be accomplished using collapsible supports 112 attached to the harvest chamber 102 and upper lid 106, such that the shades 200 are lifted at the same rate as the disks 110. The attachment points along the collapsible support 112 may be different than those of the sorbent disks 110 on other collapsible supports 112, such that the shade provided is sufficient. In some embodiments, the shades 200 may be parallel, while in other embodiments they may be non-parallel, having different angles with respect to each other and the harvest chamber 102. According to various embodiments, the closed configuration 148 comprises the plurality of shades 200 being lowered and collapsed such that the outer wall 122 of the harvest chamber 102 remains exposed to sunlight 154.

In some embodiments, the lower lid 166 may simply be a dummy/inactive sorbent disk (e.g., sized like a disk 110). This dummy disk 110 may be coupled to the plurality of collapsible supports 112 beneath the plurality of disks 110. Rather than pressing up against an upper flange 168, this dummy disk lower lid 166 may be held within the opening 120 while the DAC device 100 is in the open configuration 140 such that flow through the opening 120 is limited to the space between the perimeter of the opening 120 (which may be the same diameter as the inner cylinder 118, omitting the inward-pointing flange of other embodiments) and the loss of heated water vapor 152 from the inner cylinder 118 is reduced.

In some embodiments, these devices may be organized into clusters and systems, and may provide continuous capture of carbon dioxide, as well as supply a continuous stream of $CO_2$ enriched gas 158. In other embodiments, these devices 100 might be installed and operated as individual units.

As a specific example, in one embodiment, each device 100 is able to capture roughly 80 kg of carbon dioxide each day. In this particular, non-limiting example, the devices 100 are sized such that twelve of them can fit inside a standard shipping container, a desirable packaging due to the already existing infrastructure and skill for handling such containers on land and sea, road and rail. These twelve devices 100, operating together as a system, are able to deliver a continuous stream of $CO_2$ enriched gas 158, capturing roughly one metric ton from the atmosphere each day.

Additionally, in some embodiments, some of the devices 100, systems, and methods contemplated herein may be implemented autonomously or semi-autonomously, adjusting for changing environmental conditions to improve efficacy and efficiency. These embodiments may comprise one or more sensors 186 communicatively coupled to a control system. In some embodiments, changes in configuration may be triggered in response to data from one or more sensors 186 monitoring the sorbent material 108 itself. In other embodiments, changes in configuration may be triggered based on environmental conditions observed by sensors 186, which allow the control system to make assumptions about the state of the sorbent material 108 (e.g., based on temperature, humidity, and wind speed an estimation of how long until the sorbent material 108 is loaded).

Where the above examples, embodiments and implementations reference examples, it should be understood by those of ordinary skill in the art that other capture structures, harvest chambers, sorbent materials, devices and examples could be intermixed or substituted with those provided. In places where the description above refers to particular embodiments of a device and method for passive collection of atmospheric carbon dioxide with a double-walled harvest chamber, it should be readily apparent that a number of modifications may be made without departing from the spirit thereof and that these embodiments and implementations may be applied to other DAC technologies as well. Accordingly, the disclosed subject matter is intended to embrace all such alterations, modifications and variations that fall within the spirit and scope of the disclosure and the knowledge of one of ordinary skill in the art.

What is claimed is:

1. A device for passive collection of atmospheric carbon dioxide, comprising:

a harvest chamber comprising an inner wall forming an inner cylinder with an opening, an outer wall, an annular void between the inner wall and outer wall, and a water-filled sump at the bottom of the harvest chamber connecting the annular void and the inner cylinder;

a capture structure coupled to the harvest chamber and comprising a sorbent material, the capture structure being movable between an open configuration and a closed configuration;

an upper lid positioned above the capture structure, the upper lid coupled to the capture structure;

a water delivery device comprising at least one water applicator and a water pump, the at least one water applicator positioned within the annular void proximate the top of the annular void and configured to dispense liquid water onto a surface of at least one of the inner wall and outer wall within the annular void, the water pump in fluid communication with the water-filled sump and configured to transfer liquid water from the water-filled sump to the at least one water applicator; and wherein the open configuration comprises the capture structure extending upward from the harvest chamber to expose at least a portion of the capture structure to an airflow and allow the sorbent material to capture atmospheric carbon dioxide, the capture structure expanded to occupy a collection volume;

wherein the closed configuration comprises the capture structure collapsed to occupy a regeneration volume that is smaller than the collection volume, the upper lid covering the opening of the inner cylinder, the capture structure being sufficiently enclosed inside the inner cylinder that a heated water vapor operates on the sorbent material of the capture structure to release captured carbon dioxide from the sorbent material to form an enriched gas within the harvest chamber, the heated water vapor created by the solar heating of the outer wall and the liquid water dispensed by the water delivery device within the annular void; and wherein the enriched gas is provided as a product stream through a product outlet in fluid communication with the inside of the harvest chamber.

2. The device of claim 1:

wherein the capture structure comprises a plurality of collapsible supports and a plurality of disks coupled to and spaced along the plurality of collapsible supports, each disk comprising the sorbent material; and wherein the closed configuration comprises the plurality of collapsible supports of the capture structure being collapsed inside the harvest chamber.

3. The device of claim 1, further comprising:

a lower lid coupled to the capture structure and positioned below the capture structure such that the capture structure is between the lower lid and the upper lid;

wherein moving from the closed configuration to the open configuration comprises the lower lid rising up the inner cylinder;

wherein the open configuration further comprises the lower lid blocking the opening of the inner cylinder while the capture structure is in the open configuration such that the loss of heated water vapor from the inner cylinder is reduced.

4. The device of claim 1, wherein the at least one water applicator is a spray nozzle.

5. A device for passive collection of atmospheric carbon dioxide, comprising:

a harvest chamber comprising an inner wall forming an inner cylinder with an opening, an outer wall, an annular void between the inner wall and outer wall, and a water-filled sump at the bottom of the harvest chamber connecting the annular void and the inner cylinder;

a capture structure coupled to the harvest chamber and comprising a sorbent material, the capture structure being movable between an open configuration and a closed configuration;

an upper lid positioned above the capture structure, the upper lid coupled to the capture structure;

a water delivery device comprising at least one water applicator and a water pump, the at least one water applicator positioned within the annular void proximate the top of the annular void and configured to dispense liquid water onto a surface of at least one of the inner wall and outer wall within the annular void, the water pump in fluid communication with the water-filled sump and configured to transfer liquid water from the water-filled sump to the at least one water applicator;

a lower lid coupled to the capture structure and positioned below the capture structure such that the capture structure is between the lower lid and the upper lid; and wherein the open configuration comprises the capture structure extending upward from the harvest chamber to expose at least a portion of the capture structure to an airflow and allow the sorbent material to capture atmospheric carbon dioxide, the capture structure expanded to occupy a collection volume;

wherein the closed configuration comprises the capture structure collapsed to occupy a regeneration volume that is smaller than the collection volume, the upper lid covering the opening of the inner cylinder, the capture structure being sufficiently enclosed inside the inner cylinder that a heated water vapor operates on the sorbent material of the capture structure to release captured carbon dioxide from the sorbent material to form an enriched gas within the harvest chamber, the heated water vapor created by the solar heating of the outer wall and the liquid water dispensed by the water delivery device within the annular void;

wherein the enriched gas is provided as a product stream through a product outlet in fluid communication with the inside of the harvest chamber;

wherein moving from the closed configuration to the open configuration comprises the lower lid rising up the inner cylinder;

wherein the open configuration further comprises the lower lid blocking the opening of the inner cylinder while the capture structure is in the open configuration such that the loss of heated water vapor from the inner cylinder is reduced; and wherein the harvest chamber further comprises a solar coating on an exterior surface, the solar coating configured to increase the absorption of sunlight to heat the outer wall of the harvest chamber.

6. The device of claim 5, further comprising:

a plurality of shades positioned outside the harvest chamber and coupled to the upper lid;

wherein moving from the closed configuration to the open configuration comprises the plurality of shades being elevated with the capture structure;

wherein the open configuration further comprises the plurality of shades being positioned to shield the sorbent material of the capture structure from direct exposure to sunlight while allowing the outer wall of the harvest chamber to be exposed to sunlight; and wherein the closed configuration further comprises the plurality of shades being lowered and collapsed such that the outer wall of the harvest chamber remains exposed to sunlight.

7. The device of claim 5, wherein the inner wall comprises a plurality of return vents proximate the top of the annular void, wherein the annular void is in fluid communication with the inner cylinder through the plurality of return vents.

8. The device of claim 5:

wherein the harvest chamber further comprises an upper flange around the perimeter of the opening; and wherein the closed configuration further comprises the lower lid pressed against an interior surface of the upper flange, the interior surface facing toward the inner cylinder.

9. The device of claim 5:

wherein the lower lid further comprises an aperture and a cover that is wider than the aperture and on top of the lower lid;

wherein the open configuration further comprises the cover resting on top of the aperture such that the flow of heated water vapor through the aperture from beneath the lower lid is prevented such that the loss of heated water vapor from the inner cylinder is reduced;

wherein moving from the open configuration to the closed configuration comprises the lower lid being lowered onto a protrusion inside the inner cylinder, the protrusion passing through the aperture and lifting the cover off of the lower lid; and wherein the closed configuration further comprises the cover being raised off of the aperture by the protrusion such that heated water vapor can flow through the aperture from beneath the lower lid.

10. The device of claim 5, further comprising a fan inside the inner cylinder, positioned above the water-filled sump and below the capture structure, the fan configured to increase movement of the heated water vapor within the harvest chamber.

11. The device of claim 5, wherein the water delivery device comprises a plurality of water applicators, each water applicator of the plurality of water applicators being located within a different segment of the annular void and configured to dispense liquid water onto the surface of at least one of the inner wall and outer wall within that segment of the annular void.

12. The device of claim 11, further comprising:

at least one sensor communicatively coupled to the water delivery device;

wherein the water delivery device is configured to dispense liquid water to a segment of the annular void through a water applicator within said segment in response to a condition detected on the outer wall of said segment by the at least one sensor;

wherein the condition is at least one of a temperature and a sunlight exposure.

13. The device of claim 11, wherein the water delivery device is configured to dispense liquid water to a segment of the annular void through a water applicator within said segment in response to a timer.

14. A device for passive collection of atmospheric carbon dioxide, comprising:

a harvest chamber comprising an inner wall forming an inner cylinder with an opening, an outer wall, an annular void between the inner wall and outer wall, and a water-filled sump at the bottom of the harvest chamber connecting the annular void and the inner cylinder;

a capture structure coupled to the harvest chamber and comprising a sorbent material, the capture structure being movable between an open configuration and a closed configuration and comprising a plurality of collapsible supports and a plurality of disks coupled to and spaced along the plurality of collapsible supports, each disk comprising the sorbent material;

an upper lid positioned above the capture structure, the upper lid coupled to the capture structure;

a water delivery device comprising a plurality of water applicators and a water pump, each water applicator of the plurality of water applicator positioned within the annular void proximate the top of the annular void and located within a different segment of the annular void, each configured to dispense liquid water onto the surface of at least one of the inner wall and outer wall within that segment of the annular void, the water pump in fluid communication with the water-filled sump and configured to transfer liquid water from the water-filled sump to the plurality of water applicators;

a lower lid coupled to the capture structure and positioned below the capture structure such that the capture structure is between the lower lid and the upper lid; and wherein the open configuration comprises the capture structure extending upward from the harvest chamber to expose at least a portion of the capture structure to an airflow and allow the sorbent material to capture atmospheric carbon dioxide, the capture structure expanded to occupy a collection volume;

wherein the closed configuration comprises the capture structure collapsed to occupy a regeneration volume that is smaller than the collection volume, the upper lid covering the opening of the inner cylinder, the capture structure being sufficiently enclosed inside the inner cylinder that a heated water vapor operates on the sorbent material of the capture structure to release captured carbon dioxide from the sorbent material to form an enriched gas within the harvest chamber, the heated water vapor created by the solar heating of the outer wall and the liquid water dispensed by the water delivery device within the annular void;

wherein the enriched gas is provided as a product stream through a product outlet in fluid communication with the inside of the harvest chamber;

wherein moving from the closed configuration to the open configuration comprises the lower lid rising up the inner cylinder;

wherein the open configuration further comprises the lower lid blocking the opening of the inner cylinder while the capture structure is in the open configuration such that the loss of heated water vapor from the inner cylinder is reduced; and wherein the harvest chamber further comprises a solar coating on an exterior surface, the solar coating configured to increase the absorption of sunlight to heat the outer wall of the harvest chamber.

15. The device of claim 14:

wherein the lower lid further comprises an aperture and a cover that is wider than the aperture and on top of the lower lid;

wherein the open configuration further comprises the cover resting on top of the aperture such that the flow of heated water vapor through the aperture from beneath the lower lid is prevented such that the loss of heated water vapor from the inner cylinder is reduced;

wherein moving from the open configuration to the closed configuration comprises the lower lid being lowered onto a protrusion inside the inner cylinder, the protrusion passing through the aperture and lifting the cover off of the lower lid; and wherein the closed configuration further comprises the cover being raised off of the aperture by the protrusion such that heated water vapor can flow through the aperture from beneath the lower lid.

16. The device of claim 14, further comprising a fan inside the inner cylinder, positioned above the water-filled sump and below the capture structure, the fan configured to increase movement of the heated water vapor within the harvest chamber.

17. The device of claim 14, further comprising:

at least one sensor communicatively coupled to the water delivery device;

wherein the water delivery device is configured to dispense liquid water to a segment of the annular void through a water applicator within said segment in response to a condition detected on the outer wall of said segment by the at least one sensor;

wherein the condition is at least one of a temperature and a sunlight exposure.

18. The device of claim 14, wherein the water delivery device is configured to dispense liquid water to a segment of the annular void through a water applicator within said segment in response to a timer.

19. The device of claim 14:

wherein the harvest chamber further comprises an upper flange around the perimeter of the opening; and wherein the closed configuration further comprises the lower lid pressed against an interior surface of the upper flange, the interior surface facing toward the inner cylinder.

20. The device of claim 14:

wherein the lower lid is sized like a disk of the plurality of disks and is coupled to the plurality of collapsible supports beneath the plurality of disks; and wherein the open configuration comprises the lower lid being elevated below the plurality of disks and positioned inside the opening of the inner cylinder such that the loss of heated water vapor from the inner cylinder is reduced.

* * * * *